United States Patent

[11] 3,571,681

| [72] | Inventor | Stephen K. Burns |
| --- | --- | --- |
| | | Cambridge, Mass. |
| [21] | Appl. No. | 825,597 |
| [22] | Filed | May 19, 1969 |
| [45] | Patented | Mar. 23, 1971 |
| [73] | Assignee | Herbert Berman |
| | | Brookline, Mass. |

[54] CONTROLLABLE SPEED MULTIPLE PHASE MOTOR
2 Claims, 3 Drawing Figs.

| [52] | U.S. Cl. | 318/227, 318/231 |
| --- | --- | --- |
| [51] | Int. Cl. | H02p 5/40 |
| [50] | Field of Search | 318/231, 227 |

[56] References Cited
UNITED STATES PATENTS

| 2,863,108 | 12/1958 | Raffensperger | 318/231 |
| --- | --- | --- | --- |
| 3,112,433 | 11/1963 | Fairbanks | 318/231 |
| 3,243,677 | 3/1966 | Cannalte et al. | 318/231 |

Primary Examiner—Oris L. Rader
Assistant Examiner—K. L. Crosson
Attorney—Wolf, Greenfield & Sacks ABSTRACT: A variable frequency oscillator drives a two-phase generator to provide quadrature components at a quarter of the oscillator frequency. These signals in phase quadrature are applied to respective gate-pairs that are enabled in synchronism with the oscillator output. Each gate-pair drives a respective power amplifying bridge to which a respective motor winding is connected to apply a peak-to-peak drive to each winding that is about twice the DC voltage available from the power supply.

INVENTOR.
STEPHEN K. BURNS

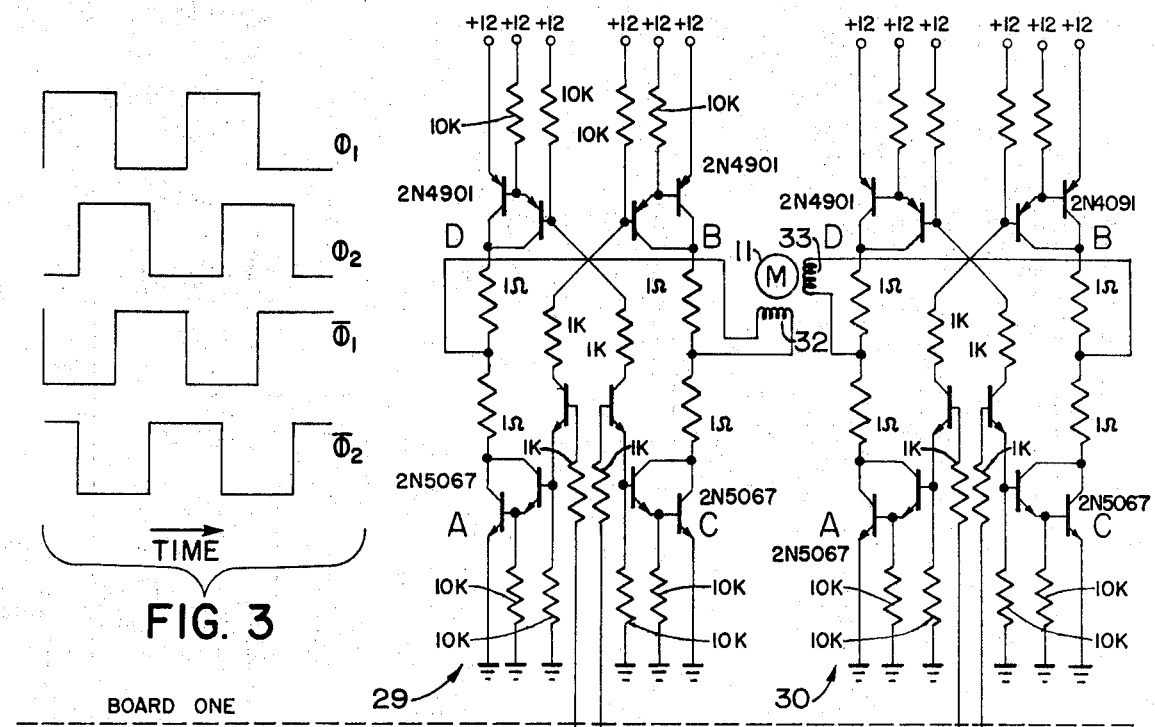
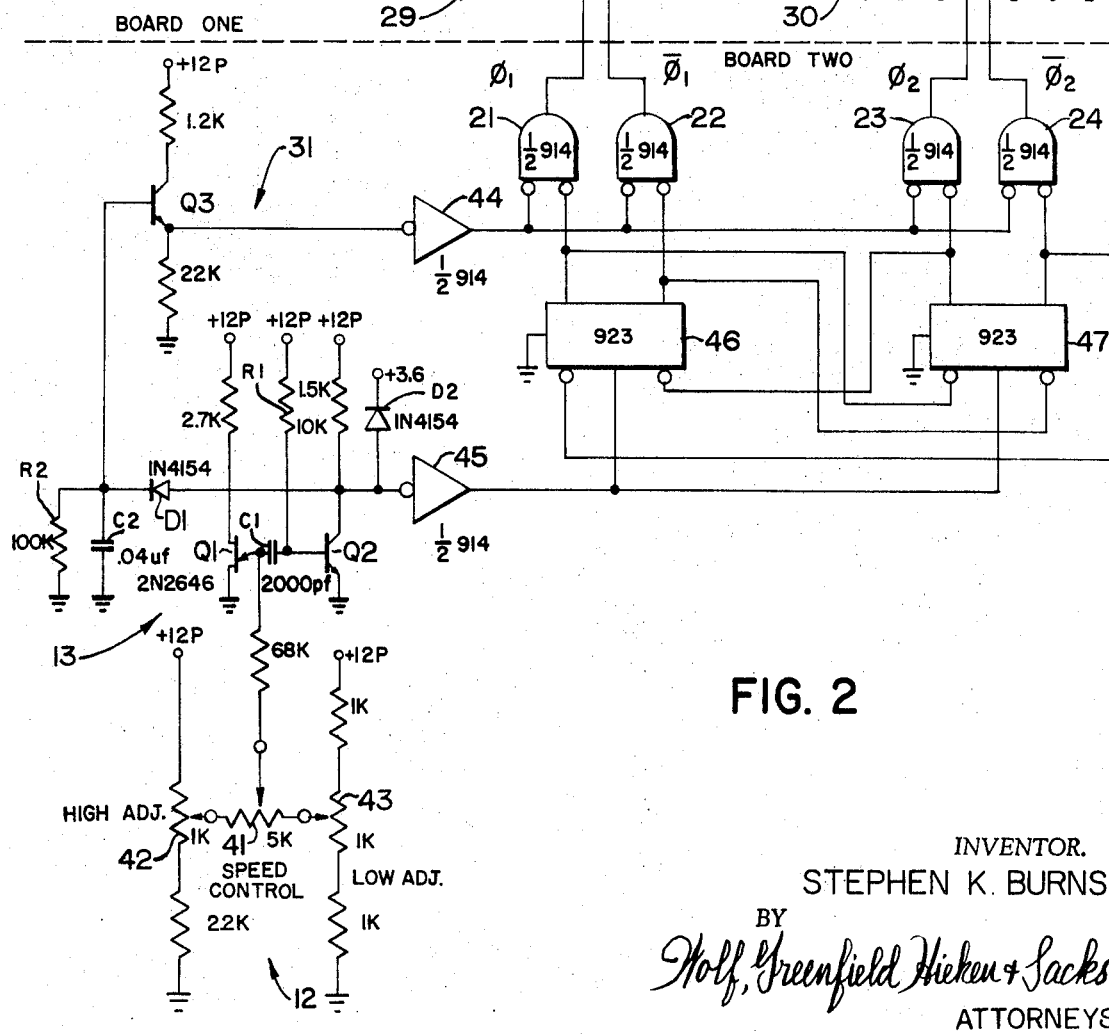
FIG. 3
FIG. 2
INVENTOR.
STEPHEN K. BURNS
BY
Wolf, Greenfield, Hieken & Sacks
ATTORNEYS

//3,571,681//

CONTROLLABLE SPEED MULTIPLE PHASE MOTOR

BACKGROUND OF THE INVENTION

The present invention relates in general to controllable speed multiple phase motors and more particularly concerns a novel two-phase motor system where controlling a basic oscillator frequency controls the motor speed over a wide range of frequencies while efficiently energizing the motor windings in phase quadrature over the frequency range.

It is an important object of this invention to provide methods and means for controlling the speed of a multiple phase motor while efficiently driving it.

It is another object of the invention to achieve the preceding object with reliable circuitry providing speed adjustment over a relatively wide range.

It is a further object of the invention to interrupt the delivery of energy to the motor when the frequency of the exciting energy is less than a predetermined lower limit value.

SUMMARY OF THE INVENTION

According to the invention, there is an oscillator of controllable frequency that drives logical circuitry comprising two-phase generating means having a plurality of output lines for signifying the occurrence of respective phases cyclically at a rate determined by the oscillator. There is a corresponding plurality of logic gates, each associated with a respective output line of the phase generating means, each having another leg jointly energized by a signal derived from the variable frequency oscillator. The outputs of respective pairs of the gates then drive respective bridge circuits that supply energy to the respective windings of the motor. Typically the motor is a two-phase motor, and there are four logic gates. Preferably the invention includes means for interrupting the flow of energy to the motor when the frequency of the exciting energy is less than a predetermined value.

Numerous other features, objects and advantages of the invention will become apparent from the following specification when read in connection with the accompanying drawings in which:

BRIEF DESCRIPTION OF THE DRAWINGS

FIG. 2 is a schematic circuit-integrated circuit diagram of an exemplary embodiment of the invention; and FIG. 3 is a graphical representation of the phase 1 and 2 signal and their respective complements plotted to a common time scale.

DETAILED DESCRIPTION OF PREFERRED EMBODIMENTS

Figure 1:
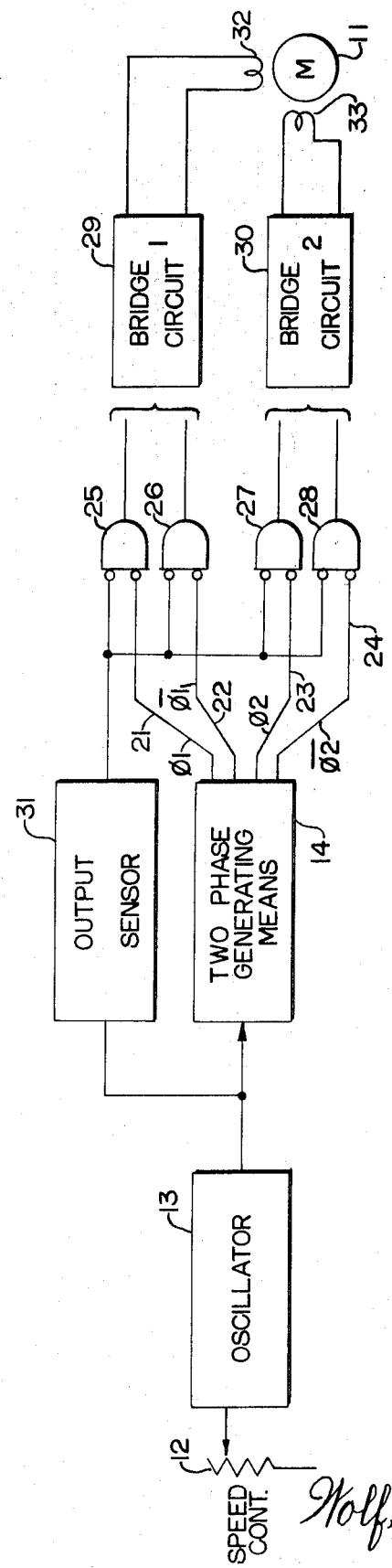
FIG. 1 is a block diagram generally illustrating the logical arrangement of a system according to the invention.

With reference now to the drawing and more particularly to FIG. 1 thereof, there is shown a block diagram illustrating the logical arrangement of a system according to the invention. A two-phase motor 11, having field windings 32 and 33 is driven at a frequency determined by the setting of speed control 12 which adjusts the frequency of variable frequency oscillator 13. The variable frequency oscillator 13 steps two-phase generating means 14 so that it provides the levels of $\phi_1$, $\phi_2$, $\overline{\phi_1}$ and $\overline{\phi_2}$ in that sequence at a rate corresponding to one-quarter of the frequency of oscillator 13.

Each of the output lines 21, 22, 23 and 24 are associated with a respective one of NAND gates 25, 26, 27 and 28 to enable the associated NAND gate once every two intervals to pass a pulse when the jointly energized legs of each gate receive a signal from output sensor 31 indicating oscillator 13 is oscillating. The output sensor might be connected at the output of the two-phase generator to detect a failure in the drive of either bridge rather than oscillator failure. The outputs of gates 25 and 26 energize the bridge circuit 1 29 that drives the phase-one winding 32 of motor 11 while the outputs of gates 27 and 28 drive bridge circuit 2 30 which energizes the phase-two winding 33 of motor 11. The net result is that windings 32 and 33 are driven with square waves in time quadrature of frequency corresponding to one-quarter that of oscillator 13 to efficiently drive the motor 11 over a wide range of speeds.

Referring to FIG. 2, there is shown a schematic circuit-integrated circuit diagram of an exemplary embodiment of the invention. Since those skilled in the art will be able to practice the invention by following the schematic circuit diagram there illustrated, only a brief description of this circuit will follow.

Unijunction transistor Q1, transistor Q2 and associated circuitry comprise oscillator 13. Potentiometers 41, 42 and 43 comprise speed control 12, potentiometers 42 and 43 permitting adjustment of the high and low limit frequencies, respectively. Diode D1 and transistor Q3, connected as an emitter follower, comprise output sensor 31 that is coupled by half 44 of a 914 integrated circuit to the jointly energized input legs of NAND gates 21, 22, 23 and 24, each comprising one-half a 914 integrated circuit.

In the operation of the relaxation oscillator shown in FIG. 2, the frequency of the oscillator is governed by the time required to charge capacitor C1 to the firing point of unijunction transistor Q1. That charging time is, of course, controlled by the speed control 12. Assuming transistor Q2 is in its conductive state, its base is near ground potential and capacitor C1 charges through the resistance of the speed control network 12. When C1 reaches the firing potential of unijunction transistor Q1, the unijunction transistor is biased into conduction and presents a low impedance discharge path for capacitor C1. With capacitor C1 discharged, both Q1 and Q2 become nonconductive. However Q2 remains off only for the short time required for capacitor C1 to discharge and Q2 is then quickly restored to conduction by the potential impressed through resistor R1. The output of oscillator 13 is thus a train of narrow pulses that is coupled by diode D1 to the integrator formed by capacitor C2 and resistor R2. The pulses in the train are essentially all of the same amplitude when the oscillator is functioning properly. This results from the action of diode D2 which prevents the voltage at the collector of transistor Q2 from rising above a reference value, designated +3.6 volts in FIG. 2. Thus, when transistor Q2 is nonconductive, its collector potential forwardly biases diode D1 and causes capacitor C2 to charge through diode D1 toward +3.6 volts. Transistor Q3 acts as a high input impedance emitter follower and presents to amplifier 44 the voltage appearing across capacitor C2. When this signal is sufficiently large, the amplifier 44 inverts the "high" input and emits a "low" signal to NAND gates 21, 22, 23 & 24, causing those gates to be enabled. Thus, so long as capacitor C2 is charged to a sufficiently high level, the output of amplifier 44 will remain low and the NAND gates are enabled. Where the charge on capacitor C2 drops below that level, the emitter potential of transistor Q3 drops toward ground. Amplifier 44 thereupon emits a "high" signal to the NAND gates, causing those gates to be disabled. Upon being disabled, the NAND gates prevent driving signals from being applied to the bridge circuits, whereupon the bridge circuits cease to apply voltage pulses to the windings of the motor and power to the motor is, in effect, turned off. Thus, burnout of the windings is prevented where the frequency of oscillator 13 drops below an unsafe minimum frequency.

The collector of transistor Q2 is coupled by a half 45 of a 914 integrated circuit to triggering inputs of 923 integrated circuits 46 and 47 functioning as phase 1 and phase 2 flip-flops respectively. These flip-flops are so connected that their states complement sequentially. The outputs are thus in time quadrature. The gating eliminates drive to the bridges when the oscillator frequency is below the threshold determined by the output sensor 31.

Bridge circuit 1 29 and bridge circuit 2 30 comprise like circuits in which first the A and B power transistors are conductive and then the C and D transistors are conductive in response to output signals from the respective gates, thereby driving windings 32 and 33 with rectangular pulses in time quadrature. A feature of this circuitry is that the peak-to-peak voltage across the motor windings is approximately twice the DC potential available from the DC supply. Resistors prevent the windings from drawing excessive current that might damage the transistors. The substantially constant voltage drive produces less torque with increasing speed, a desirable feature for a dental drill.

An exemplary embodiment of this invention is capable of driving a 1/40-horsepower motor from 18,000 r.p.m. to 100,000 r.p.m. without stalling under appreciable loads and is especially useful as a motor for rotating dental drills and the like.

There has been described novel efficient reliable multiple-phase motor driving apparatus characterized by high efficiency, reliability and relatively small size. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed, and limited solely by the spirit and scope of the appended claims.

I claim:

1. A system for controlling the speed of an electric motor of the multiple phase type having a plurality of separately energizable field windings, the system comprising:

a variable oscillator;

bridge circuit means for providing voltage pulses to the field windings, the bridge circuit means impressing voltage pulses on the field windings at a repetition rate controlled by the frequency of the variable oscillator, the voltage pulses impressed upon each field winding having the same repetition rate but being displaced in phase relative to the voltage pulses impressed upon any other field winding of the motor;

logic circuit means driven by the variable oscillator, the logic circuit means providing a plurality of phase displaced signals at a rate controlled by the variable oscillator;

a plurality of logic gates, each logic gate, when enabled, coupling a different one of the phase displaced signals from the logic circuit means to the bridge circuit means to cause the bridge circuit means to impress voltage pulses on the field windings; and and sensor means coupled between the output of the variable oscillator and the input of the logic gates for providing an enabling signal to each of the logic gates when the variable oscillators frequency is above a minimum frequency and disabling the gates when the oscillator drops below the minimum frequency.

2. The system according to claim 1 for controlling the speed of an electric motor wherein the output of the variable oscillator is a train of pulses and the sensor means includes an integrator for integrating the pulses in the train.